Nov. 24, 1942.  E. C. WALSH  2,302,987
TEMPERATURE CONTROL SYSTEM
Filed Sept. 15, 1939  3 Sheets—Sheet 1

Inventor
Edward C. Walsh
By George H. Fisher
Attorney

Fig. 3

Nov. 24, 1942.	E. C. WALSH	2,302,987
TEMPERATURE CONTROL SYSTEM
Filed Sept. 15, 1939	3 Sheets-Sheet 3

Fig.4

Inventor
Edward C. Walsh
By George H Fisher
Attorney

Patented Nov. 24, 1942

2,302,987

UNITED STATES PATENT OFFICE 2,302,987

TEMPERATURE CONTROL SYSTEM

Edward C. Walsh, Minneapolis, Minn., assignor to Minneapolis-Honeywell Regulator Company, Minneapolis, Minn., a corporation of Delaware Application September 15, 1939, Serial No. 295,074

14 Claims. (Cl. 236—1)

My invention as disclosed herein relates to temperature control and has to do particularly with methods and means of improving the control of normally intermittently operated temperature controlled devices so as to produce continuous or substantially continuous operation.

My invention may be employed in either heating or cooling systems but finds noteworthy adaptability in gas fired heating systems, although it may be practiced in similar systems employing fluid medium.

An object of the invention is to produce more continuous operation of a thermostatically controlled normally intermittently operated temperature changing device by operating the device at a given rate when the thermostat is on and then at a rate proportional to the duration of the on period when the thermostat is off.

Another object is to provide a gas fired heating system wherein a standby valve is positioned in accordance with the length of time the thermostat calls for heat and is in control when the thermostat is satisfied.

Another object is to provide a method of load measurement in temperature control systems, the required temperature changing rate being measured in terms of time per degree of temperature change.

Another object is the provision of temperature control system employing a fluid medium controlled by valve means wherein a standby valve is in control when the thermostat is not calling for increased or reduced temperature changing effect and the standby valve is adjusted in position in accordance with the length of time the thermostat calls for increased or reduced temperature changing effect.

Another object is the provision in a temperature control system of a valve controlled by a thermostat which valve is opened wide when the thermostat is unsatisfied and drops back to a standby position proportional to the length of time the thermostat was unsatisfied when the thermostat does become satisfied.

Other objects and numerous advantageous features of my invention will become apparent from the following detailed description and annexed drawings wherein:

Figure 1:
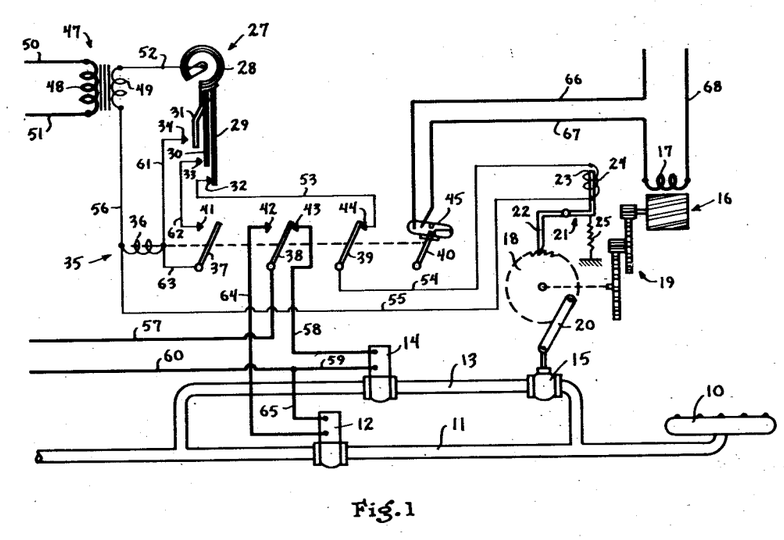
Figure 1 is a diagrammatic representation of a gas fired heating system embodying my invention.

Referring to Figure 1 of the drawings, numeral 10 represents a gas burner such as may be employed in conventional type gas fired heating systems adapted to be controlled by a thermostat. Numeral 11 designates a gas conduit for supplying gas to the burner 10 in which is interposed an electric control valve 12. Numeral 13 designates a by-pass around the valve 12, there being interposed in the by-pass an electric control valve 14 similar to the valve 12 and beyond the valve 14 is a motor operated standby valve 15. The motor for driving the valve 15 is designated at 16, the motor having a winding 17 and driving a ratchet wheel 18 through reduction gear train 19. The stem of the valve 15 is connected to a point on the periphery of the ratchet wheel 18 by a link 20. The standby valve 15 is biased in closing direction by a biasing means within the valve. To prevent the valve from going to closed position whenever the motor 16 is deenergized, a pivoted angular lever 21 having a portion 22 forming a pawl is employed. Another portion of the lever 21 forms an armature 23 cooperating with a solenoid winding 24. Coil spring 25 biases the lever 21 in a clockwise direction about its pivot. However, the winding 24 as shown on the drawings is energized urging the lever 21 in a counter-clockwise direction about its pivot so that the pawl 22 engages the teeth of the ratchet wheel 18 preventing rotation of the ratchet wheel.

Numeral 27 designates generally a thermostat which may be located in a space being heated by means of heat from the gas burner 10. The thermostat 27 includes a bimetal element 28 arranged to actuate three switch blades 29, 30 and 31, the blades 29 and 30 being flexible and the three blades cooperating with fixed electrical contacts 32, 33, and 34. The switch blades of the thermostat are moved to the left upon a drop in temperature and the blade 30 engages its associated contact at a temperature which may be one degree lower than the temperature at which blade 29 engages contact 32. The blade 31 engages the contact 34 at a temperature which may be one degree lower for example than the temperature at which blade 30 engages contact 33.

Numeral 35 designates an electrical relay controlled by electrical thermostat 27, comprising a winding 36 and a plurality of switch blades 37, 38, 39 and a movable arm 40. The coil 36 actuates an armature connected to the switch blades and the arm 40 so that the blades and arm are moved to the left when the coil 36 is energized, the blades 37 and 38 engaging with fixed electrical contacts 41 and 42 when the coil 36 is energized. The blades 38 and 39 engage with fixed electrical contacts 43 and 44, respectively, when the coil 36 is deenergized. The arm 40 is arranged to actuate a time delay mercury type switch 45, the switch becoming closed when the coil 36 is deenergized. In the interior of the mercury tube 45 is an orificed baffle plate so arranged that when the switch is tilted to the left a few seconds elapse before the mercury runs through the orifice and connects the electrodes which are at the left end of the tube. Conversely, when the coil 36 is deenergized a few seconds elapse as determined by the time delay switch 45 before this switch is opened.

Power for operation of the control system is supplied by the step-down transformer 47 of known type comprising a primary winding 48 and a secondary winding 49 having a fewer number of turns than the primary winding. The primary 48 may be connected by wires 50 and 51 to any suitable line conductors.

With the parts in the position shown the standby valve is in control and is in a partly open position such as to supply just sufficient heat to maintain the desired temperature in the spaces being heated. The thermostat 27 is in a position wherein relay 35 is deenergized, that is, wherein there is not a demand for increasing heating but wherein the temperature of the spaces being heated is not too high. In this position of the thermostat a circuit is completed through the blade 29 energizing the coil winding 24 so as to keep the standby valve 15 from returning to fully closed position. This circuit is as follows: from secondary winding 49 of the transformer through a wire 52, element 28 of thermostat 27, blade 29, contact 32, wire 53, contact 44, blade 39, wire 54, winding 24, wire 55 and wire 56 back to secondary winding 49. With the parts in the position shown the valve 14 is energized and open so as to permit flow of gas through the by-pass connection and the standby valve to the gas burner. The circuit for the valve 14 is as follows: from a wire 57 through blade 38, contact 43, wire 58, valve 14, and wire 59 to wire 60. The wires 57 and 60 may be connected to any suitable line conductors. The thermostat 27 may be so adjusted that the blade 29 engages and disengages from contacts 32 at a temperature of 71°, for example, and with the parts in the position shown should the standby valve 15 be in too wide open position or should there be a decrease in the heating load such that the temperature should rise above 71° causing blade 29 to disengage from contact 32 the winding 24 would be deenergized causing the standby valve 15 to be moved to closed position under the influence of its bias. Heating would therefore be terminated and there would be no further supply of gas until the temperature fell to a value causing all of the thermostatic blades to engage their respective contacts.

On the other hand, standby valve 15 might be in a position not wide enough open or there might be an increase in the heating load causing blades 30 and 31 to engage their associated contacts without blade 29 having disengaged from contact 32. Upon this occurring, a circuit energizing relay winding 36 is completed as follows: from secondary 49 through wire 52, thermostatic element 28, blade 31, contact 34, wire 61, winding 36, and wire 56 back to secondary 49. As soon as the switch blade 37 engages contact 41 a maintaining circuit for the relay 46 is maintained as follows: from secondary winding 49, wire 52, thermostatic element 28, blade 30, contact 33, wire 62, contact 41, blade 37, wire 63, winding 36 and wire 56 back to secondary 49. Upon energization of coil 36 blade 38 is moved away from contact 43 deenergizing and closing valve 14 and is moved into engagement with contact 42 completing a circuit energizing the valve 12 as follows: from wire 57 to blade 38, contact 42, wire 64, valve 12 and wire 65 back to wire 60. Movement of blade 39 out of engagement with contact 44 deenergizes coil 24 and the bias of standby valve 15 returns the standby valve to closed position, the spring 25 of course moving pawl 22 out of engagement with the ratchet wheel 18. A few seconds after relay 35 is energized and arm 40 is moved to the left, the electrodes of mercury switch 45 are bridged by the mercury therein energizing the motor 16 through the following circuit: from wire 66 to mercury switch 45, wire 67, motor winding 17 to wire 68. The wires 66 and 68 may be connected to any suitable line conductors. The purpose of the time delay mercury switch 45 is to interpose a few seconds delay in the energization of the motor 16 to insure that the standby valve 15 has time to go to closed position before operation of the motor begins. As soon as operation of the motor 16 begins the standby valve 16 is gradually driven in opening direction through the gear train 19. The valve 15 slowly moves towards open position during the time that the relay 35 is energized so that when the relay 35 does become deenergized the standby valve 15 will be left in a position proportional to the length of time that the thermostat was calling for heat, that is, the time that relay 35 was energized. The length of time that the thermostat calls for heat, that is, maintains the relay 35 energized, the valve 12 being in control during this time, is of course a measure of the heating load on the system. Thus when the relay 35 is deenergized as explained above, the standby valve 15 is placed in control and inasmuch as it is in a position proportional to the heating load a uniform temperature should be maintained without further control from the thermostat 27 unless there is a change in the heating load. When the relay 35 is deenergized the parts are of course in the position shown in Figure 1 with the valve 14 energized and the valve 12 deenergized. Obviously the system will tend to maintain the temperature at a value which will keep the thermostat in the position shown in Figure 1.

From the foregoing it should be apparent to those skilled in the art that I have provided a novel control arrangement whereby an ordinarily thermostatically operated heating system or cooling system may be made to operate substantially continuously to maintain a uniform temperature in a space being served. Whenever there is a change in the load on the system only one cycle of operation of the thermostat is required to readjust the position of the standby valve to a position wherein it will just sustain the load. With this type of system when there are little or no variations in the heating load the system may operate for long periods of time under the sole control of the standby valve without any intermittent operation of the other valves.

Figure 2:
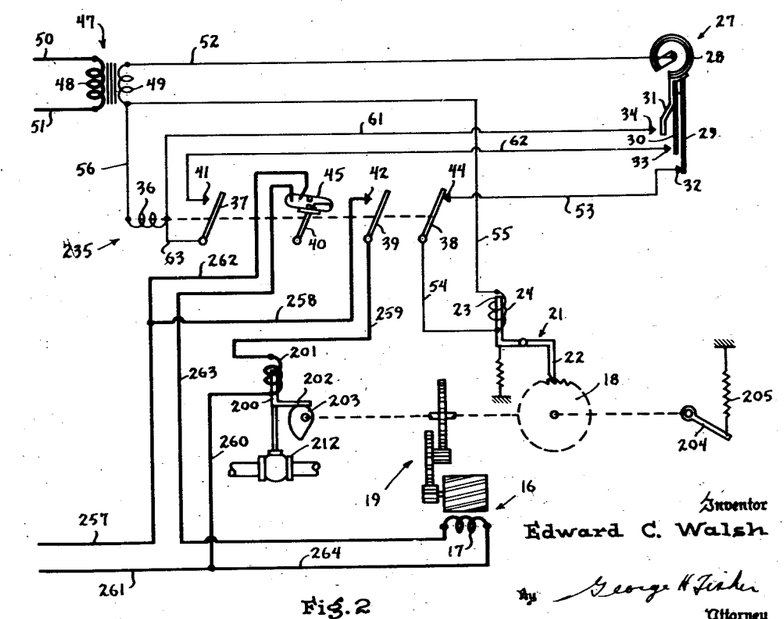
Figure 2 illustrates a second embodiment of the invention.

Referring to Figure 2 of the drawings I have shown an embodiment of the invention which operates very similarly to that of Figure 1. In Figure 2 the structure is slightly different in that I employ only a single valve instead of three valves. It will be noted in Figure 2 that the stem of the control valve 212 is connected to an armature 200 associated with the coil winding 201. The armature 200 has a horizontal member 202 adapted to cooperate with a cam 203. The cam 203 is mounted on a shaft driven by a motor 16 corresponding to that of Figure 1, the motor 16 having a winding 17 for driving the cam shaft through a reduction gear train 19. Mounted on the cam shaft is an arm 204 to which is connected a coil spring 205 biasing the cam shaft towards an initial position. A ratchet wheel 18 corresponding to that of Figure 1 is mounted on the cam shaft and an electrically controlled pawl arrangement coresponding to that of Figure 1 cooperates with the ratchet wheel 18. In the present embodiment when the relay is energized the valve 212 is moved to a wide open position. Also when the relay is energized the motor 16 is started in operation which drives the cam 203 in a clockwise direction. When the relay is deenergized the winding 201 is deenergized and the arm 202 drops down on the cam 203, the contour of the cam 203 being such that the arm 202 drops down to a position wherein the valve is open an amount determined by the length of time the motor 16 has operated to drive the cam in a clockwise direction. The thermostat 27 and transformer 47 are the same as those of Figure 1 and the relay 235 is similar except that it has an in rather than an out contact associated with the blade 39.

In the operation of the embodiment of Figure 2 when blade 29 disengages from contact 32 the circuit of winding 24 is deenergized as in Figure 1 and the cam 203 is returned to its original position under the influence of spring 205 so as to permit the valve 212 to return to a fully closed position. When blades 30 and 31 of the thermostat engage their respective contacts the relay 235 is energized by means of circuits as described in connection with Figure 1. Upon energization of the relay 235 the winding 201 is energized to fully open the valve 212 through the following circuit: from wire 257 to wire 258, contact 42, switch blade 39, wire 259, winding 201, wire 260 back to wire 261, the wires 267 and 261 being connected to any suitable line conductors. Disengagement of blade 38 from contact 44 deenergizes the coil 24 permitting the cam 203 to be returned to an initial position, and after the cam has been returned to the initial position motor 16 is energized by a circuit through the mercury switch 45 as follows: from wire 257 to wire 262, mercury switch 45, wire 263, winding 17 and wire 264 back to wire 261. While the relay 235 is energized the cam 203 is rotated in a clockwise direction and upon deenergization of the relay 235 the cam remains in its rotated position so that the valve 212 drops back to the standby position determined by the length of time that the motor was operating. Obviously therefore the operation of the embodiment of Figure 2 is closely similar to that of Figure 1 except that a single valve is employed whereas in Figure 1 three different valves are employed.

Figure 3:
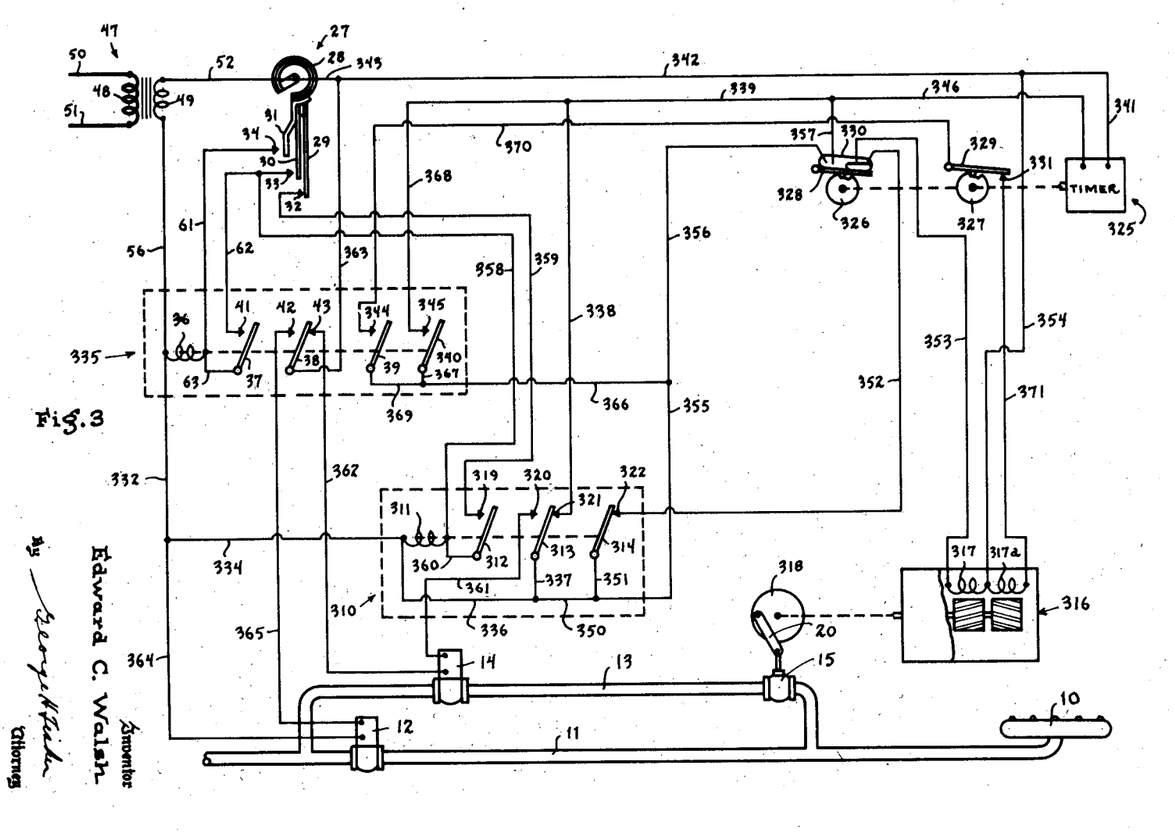
Figure 3 illustrates a third embodiment of the invention.

Referring to Figure 3 of the drawings I have shown a system wherein instead of moving the standby valve to a fully closed position when the thermostat becomes fully satisfied the standby valve is adjusted upward or downwardly depending upon whether or not the temperature deviates from within a predetermined range. In Figure 3 the burner and piping arrangement is the same as that of Figure 1 and the standby valve 15 is driven by a reversible motor 316 having windings 317 and 317a whereby the motor is driven in one direction or the other depending upon which winding is energized. The motor drives a disc 318 to which the stem of the valve 15 is connected by a link 20.

The thermostat of Figure 3 and the transformer are the same as those of Figure 1 and the relay 335 is similar with the exception that switch blade 39 engages a contact 344 when the relay is energized and there is a switch blade 340 which engages a contact 345 when the relay is energized.

The control equipment of the present embodiment includes an additional relay 310 having a coil 311 cooperating with an armature arranged to actuate a plurality of switch blades 312, 313 and 314. The switch blades 312 and 313 engage with fixed electrical contacts 319 and 320 when the relay is energized, and the switch blades 313 and 314 engage with fixed electrical contacts 321 and 322 when the relay is deenergized.

Numeral 325 designates an electrically driven timer which drives two cams indicated at 326 and 327 in a counter-clockwise direction. The cams 326 and 327 are generally circular but each having a depression in its periphery of several degrees extent. The cams 326 and 327 are arranged to actuate switch arms 328 and 329, respectively. The switch arm 328 carries a double ended mercury switch 330, the right end of which is made when the cam follower of switch arm 328 is in the depression of cam 326 and the left end of which is made when the cam follower of switch arm 328 rides on the surface of cam 326 of greater radius. The switch arm 329 cooperates with a fixed electrical contact 331 with which it is in engagement when the cam follower of switch 329 is in the depression of cam 327.

With the parts in the position shown the temperature adjacent thermostat 27 has risen above the desired range so that none of the thermostatic blades are in engagement with their respective contacts; both the relays are deenergized, both the valves 12 and 14 are closed, and the timer 326 is operating its associated switching mechanism in a manner to cause the standby valve 15 to be adjusted downwardly by successive increments at intervals, the timer as shown on Figure 3 being in a position wherein its cycle is just beginning. The circuit for the timer is as follows: from secondary 49 of transformer 47 through wire 56, wire 332, wire 334, wire 336, wire 337, switch blade 313, contact 321, wire 338, wire 339, wire 346, timer 325, wire 341, wire 342, wire 343 and wire 52 back to secondary 49. Winding 317 of the motor 316 is the winding which causes the motor to operate in closing direction of the valve 15 and a circuit for this winding is at this time completed as follows: from secondary 49 through wire 56, wire 332, wire 334, wire 336, wire 350, wire 351, switch blade 314, contact 322, wire 352, the right end of mercury switch 330, wire 353, winding 317, wire 354, wire 342, wire 343 and wire 52 back to secondary 49. The motor 316 continues in operation adjusting valve 15 in a downward direction until the timer has driven the cams 326 and 327 through a few degrees until switch arm 328 is tilted and mercury switch 330 is operated so as to open its right end and make its left end. When this happens the circuit for winding 317 is interrupted and a circuit for the timer is completed which circuit is independent of relay 310 so that the timer will continue in operation at least until the cams are back in the position shown on the drawing. The latter circuit is as follows: from secondary 49 through wire 56, wire 332, wire 334, wire 336, wire 350, wire 355, wire 356, mercury switch 330, wire 357, wire 346, wire 341, wire 342, wire 343 and wire 52 back to secondary 49. Thus it will be seen that the valve 15 is moved one increment in closing direction, and if when the timer has completed one cycle, and the relay 310 is at such time still in deenergized position the timer circuit will still be completed through switch blade 313 and the timing cycle will be repeated so that the valve 15 is adjusting another increment in closing direction. Inasmuch as during the preceding operation no gas has been supplied to the burner 10 the temperature adjacent the thermostat is falling, and when it has fallen sufficiently so that blades 29 and 30 engage their respective contacts a circuit energizing relay 310 is completed as follows: from secondary 49 through wire 52, thermostatic element 28, blade 30, contact 33, a portion of wire 62, wire 358, winding 311, wire 334, wire 332 and wire 56 back to secondary 49. At the same time a maintaining circuit for relay 310 is completed as follows: from secondary 49 through wire 52, thermostatic element 28, blade 29, contact 32, wire 359, contact 319, switch blade 312, wire 360, winding 311, wire 334, wire 332, and wire 56 back to secondary 49. Upon energization of relay 310 switch blade 313 moves into engagement with contact 320 completing a circuit for valve 14 as follows: from secondary 49 through wire 56, wire 332, wire 334, wire 336, wire 337, switch blade 313, contact 320, wire 361, valve 14, wire 362, contact 43, blade 38 (of relay 335 which is at this time deenergized) wire 363, wire 343 and wire 52 back to secondary 49. Valve 14 now opens placing the standby valve 15 in control of the system with gas being supplied at a rate which is determined by the position of the standby valve. At this time neither winding of the motor 316 can be energized and the timer is deenergized provided it has completed its last cycle and the cams are in the position shown, it being remembered that the timer always stops with the cams in the position shown. The valve 15 should now be in such a position that it will just sustain the heating load and the blade 30 may disengage from and engage again with the contact 33 without changing the status quo of the system. If however the valve 15 should be in too wide open a position or if there should be a decrease in the heating load such that the temperature should rise above the desired range causing blade 29 to disengage from contact 32 the parts will again assume the position shown in Figure 3 and the timer will go through another cycle as described above, the valve 15 being adjusted downwardly at least one increment as described and possibly more if the blades 29 and 30 remain disengaged from their respective contacts long enough for the timer to go through more than one cycle. If on the other hand while the standby valve 15 is in control it should be in a position not far enough open, or if there should be an increase in the heating load the temperature adjacent thermostat 27 will fall and eventually all of the blades will be in engagement with their respective contacts at which time a circuit energizing relay 335 will be completed as follows: from secondary 49 through wire 52, thermostatic element 28, blade 31, contact 34, wire 61, coil 36 and wire 56 back to secondary 49. At the same time a maintaining circuit will be completed as follows: from secondary 49 through wire 52, thermostatic element 28, blade 30, contact 33, wire 62, contact 41, blade 37, wire 63, coil 36 and wire 56 back to secondary 49. Upon energization of relay 335 switch blade 38 moves away from contact 43 interrupting the circuit of valve 14 causing that valve to close, switch blade 38 moving into engagement with contact 42 completing a circuit for valve 12 as follows: from secondary 49 through wire 56, wire 332, wire 364, valve 12, wire 365, contact 42, blade 38, wire 363, wire 343 and wire 52 back to secondary 49. The main valve 12 will now be in control, this valve being of a large enough capacity so that the temperature adjacent the thermostat will now rise so as to come back into the desired range. While relay 335 is energized a circuit for the timer is completed as follows: from secondary 49 through wire 56, wire 332, wire 334, wire 336, wire 350, wire 355, wire 366, wire 367, blade 340, contact 345, wire 368, wire 339, wire 346, timer 325, wire 341, wire 342, wire 343 and wire 52 back to secondary 49. A circuit for the winding 317a is completed as follows: from secondary 49 through wire 56, wire 332, wire 334, wire 336, wire 350, wire 355, wire 366, wire 369, switch blade 39, contact 344, wire 370, switch blade 329, contact 331, wire 371, winding 317a, wire 354, wire 342, wire 343 and wire 52 back to secondary 49. Correspondingly to the operation previously described the motor 316 will now operate the valve 15 in opening direction for a small increment until the timer has moved the cams through a few degrees so as to separate blade 329 from contact 331 and actuate the mercury switch so as to make its left end. When the left end of the mercury switch is made, as described above a circuit is completed for the timer whereby the timer is maintained energized until the timer has gone through one complete cycle and has returned the cam operated switches to the position shown. If relay 335 is still energized, that is, if its maintaining circuit is still complete through thermostatic blade 30 and contact 33 after the timer has completed one cycle the standby valve 15 will be moved another increment in opening direction and the timer will go through another cycle not stopping until the cycle is complete. Inasmuch however, as valve 12 is of relatively large capacity, the space temperature will be rising at this time and returning to a value within the desired range and eventually blades 30 and 31 will disengage from their respective contacts and relay 335 will be deenergized. Deenergization of relay 335 will interrupt the above described circuit for valve 12 causing this valve to close and again completing the circuit for valve 14 so that the standby valve is placed in control of the burner. When the relay 335 is deenergized as will be obvious there will be no further operation of the motor 316 in opening direction of the valve, and the timer will stop as soon as it finishes the cycle which it was on when the relay was deenergized. From the foregoing it can be seen that whenever relay 335 is deenergized and relay 310 is energized the temperature is within the desired range and the standby valve 15 is in control. When the temperature is within this range the thermostatic blade 30 may engage and disengage from contact 33, that is, there may be relatively small and slow variations in the temperature of the space such as would not be noticeable to the occupants so as to make them uncomfortable but for which variations in temperature no changes are made in the rate of gas supply. It is known to those skilled in the temperature control art that such small variations in space temperature are permissable without detracting from the comfort of the people therein because they are either too small to be noticeable or because they do not come about quickly enough to be noticeable and that to change the rate of heating for every such small variation in temperature is more apt to augment the vacillations rather than to dampen them out because of the relatively large amount of lag which normally exists in heating systems and which can very easily bring about overshooting and undershooting. If on the other hand while the conditions just described are extant the temperature should deviate outside the desired range and either cause blade 29 to disengage from contact 32 or to cause blade 31 to engage with contact 34, as described above an immediate and substantial change is made in the heating rate in order to quickly prevent the temperature from continuing to deviate outside of the desired range, and at the same time a change is made in the setting of the standby valve so that when it is next placed in control it will be properly positioned to maintain the desired temperature without intermittent on and off cycling operation. Those skilled in the art will appreciate that the peculiarities of the heating load characteristics of each installation will be a factor in the magnitude of the adjustments made in valve 15 inasmuch as the amount of upward or downward adjustment made in this valve is proportional to the length of time that the temperature is outside the desired range, and this length of time is of course representative of the individual heating characteristics of the particular installation being heated. In other words, the length of time required to raise the temperature 1° while gas is being supplied at a given rate is a measure of the relative difficulty or ease with which a building can be heated, the present system automatically measuring or ascertaining the required heating rate in this manner. This is to be distinguished from the control of a valve from an outdoor thermostat wherein for every outdoor temperature the valve will have a given position, the particular heating load characteristics of the individual installation not being a factor in the positioning of a valve in this manner.

The characteristics of the standby valve 15 will of course be governed by the nature of the installation in which the control system is used, and the period of the timing cycle of the timer similarly will be governed by the nature of the installation, this timing period of course being susceptible of considerable variation in the judgment of the control engineer.

Figure 4:
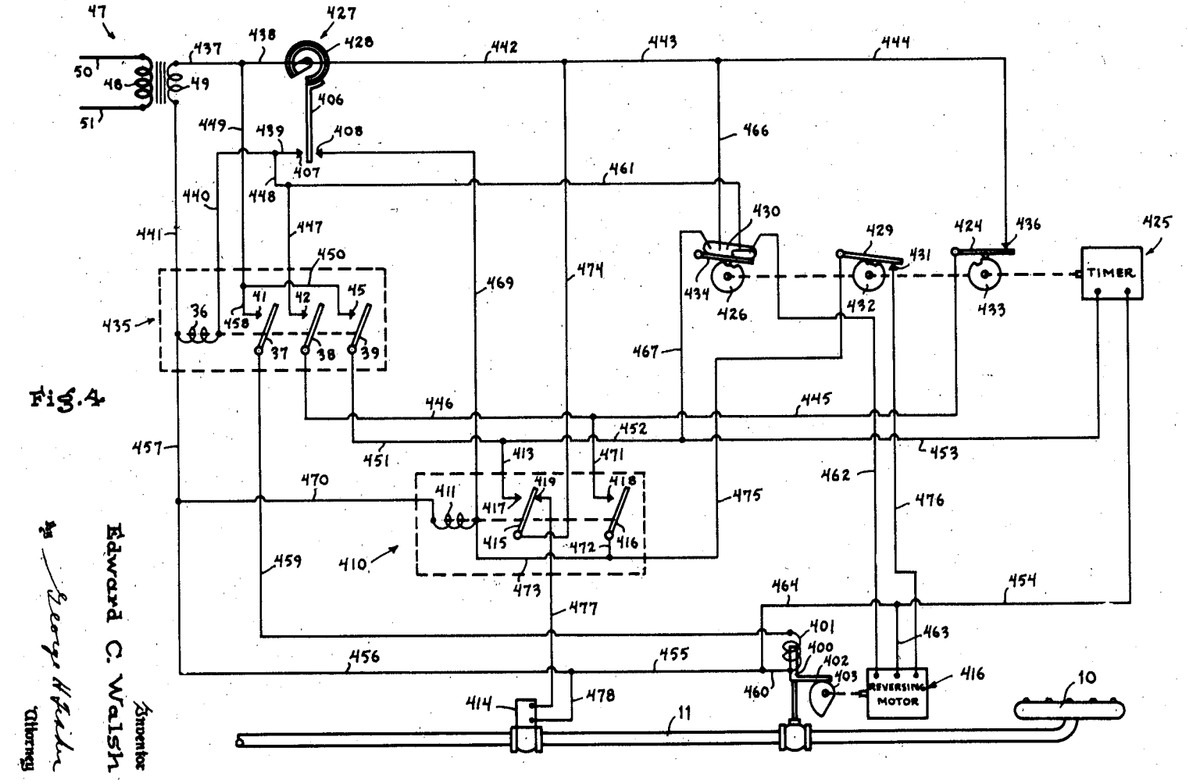
Figure 4 illustrates a fourth embodiment of the invention.

Figure 4 of the drawings represents an embodiment of the invention which operates very similarly to that of Figure 3 but wherein a thermostat of the type used with two contacts is used, and wherein a control valve of the type disclosed in Figure 2 is employed. The motor driving the cam 403 is of the reversing type corresponding to that of Figure 3. In the present embodiment a control valve 414 is employed in the conduit 11 ahead of the standby valve 412.

The thermostat 427 comprises a bimetal element 428 and a switch blade 406 cooperable with fixed electrical contacts 407 and 408. The blade 406 moves to the left upon a drop in temperature to engage with the contact 407 and at a temperature which may be one or two degrees higher for example, the blade 406 engages with the contact 408. The relay 435 of the present embodiment comprises a winding 36 associated with an armature which is arranged to actuate switch blades 37, 38 and 39 which are moved into engagement with fixed electrical contacts 41, 42 and 45. Numeral 410 designates a second relay including a coil winding 411 associated with an armature arranged to actuate switch blades 415 and 416 which engage with fixed electrical contacts 417 and 418 when the relay is energized. Blade 415 engages with fixed electrical contact 419 when the relay is deenergized.

Numeral 425 designates a timer similar to that of Figure 3 which drives a shaft having a plurality of cams 426, 432 and 433 thereon, the cams being driven in a counterclockwise direction. The cam 426 is arranged to actuate switch arm 434 carrying a mercury switch 430 corresponding to the mercury switch of Figure 3 and the cam 432 actuates a switch blade 429 cooperable with the fixed electrical contact 431. The cams 426 and 432 and their associated switches being like those of the previous embodiment need no further description. The cam 433 however, being generally circular has a single small depression of relatively small circumferential extent and this cam is arranged to actuate a switch blade 424 cooperable with a fixed electrical contact 436, the switch blade having a cam follower which drops into the depression of the cam so as to separate the switch blade from the contact 436. Obviously the blade 424 is normally in engagement with the contact 436.

With the parts in the position shown the temperature is within the desired range; both relays are deenergized; the valve 414 is in an open position and the valve 412 is in a standby position which should just sustain the load. The circuit for energizing the valve 414 is as follows: from secondary 49 through wire 437, wire 438, wire 442, wire 474, blade 415 (relay 410 being at this time deenergized), contact 419, wire 477, valve 414, wire 478, wire 456, wire 457, and wire 441 back to secondary 49. The timer is not in operation and in the position shown in Figure 4 has just completed a cycle. If the temperature should now deviate in the manner described in connection with Figure 3, for example, should it drop until the blade 406 of thermostat 427 engages the contact 407 a circuit is completed energizing the relay 435 as follows: from secondary winding 49 of transformer 47 through a wire 437, wire 438, thermostatic element 428, blade 406, contact 407, wire 439, wire 440, winding 36 and wire 441 back to secondary winding 49. Immediately upon energization of relay 435 blades 37, 38 and 39 are moved into engagement with their respective contacts, engagement of blade 38 with contact 42 completing a maintaining circuit for the coil 36 of relay 435 as follows: from secondary 49 through wire 438, wire 442, wire 443, wire 444, contact 436, blade 424, wire 445, wire 446, blade 38, contact 42, wire 447, wire 448, wire 440, coil 36 and wire 441 back to secondary 49. It will be noted that the maintaining circuit extends through the time controlled switch blade 424 so that once the thermostat has energized the relay 435 it will not be deenergized until blade 424 is disengaged from contact 436. Engagement of blade 39 with contact 45 completes a circuit energizing the timer 425 as follows: from secondary 49 through wire 437, wire 449, wire 450, contact 45, blade 39, wire 451, wire 452, wire 453, timer 425, wire 454, wire 464, wire 455, wire 456, wire 457 and wire 441 back to secondary 49. Also engagement of blade 37 with contact 41 completes a circuit for the winding 401 so as to open the standby valve 412 to a wide open position, the circuit being as follows: from secondary 49 through wire 437, wire 469, wire 458, contact 41, blade 37, wire 459, winding 401, wire 460, wire 455, wire 456, wire 457, and wire 441 back to secondary 49. Gas will now be supplied at a relatively high rate through the standby valve 412 which is in its wide open position, valve 414 being open, so that the temperature in the space adjacent thermostat 427 will tend to rise. In addition to the above described circuits engagement of blade 38 with contact 42 causes a circuit to be completed through the winding of motor 416 which causes the cam 403 to be rotated in a direction such that the valve 412 will be in a wider open position when the arm 402 again drops down on the cam. This circuit is as follows: from secondary 49 through wire 437, wire 438, wire 442, wire 443, wire 444, contact 436, switch blade 424, wire 445, wire 446, blade 38, contact 42, wire 447, wire 461, the right end of mercury switch 430, wire 462, the appropriate winding of wire 416, wire 463, wire 464, wire 455, wire 456, wire 457 and wire 441 back to secondary 49. Motor 416 will now drive the cam 403 one increment in a clockwise direction during the time that the timer is driving the cam 426 through several degrees in a counter-clockwise direction, that is, until the mercury switch is actuated so that its right end is opened and the contacts at its left end are made. When the latter action takes place the motor 416 is deenergized and a new circuit for the timer is completed which is as follows: from secondary 49 through wire 437, wire 438, wire 442, wire 443, wire 466, the left end of mercury switch 430, wire 467, wire 453, timer 425, wire 454, wire 464, wire 455, wire 456, wire 457 and wire 441 back to secondary 49. Thus as in the previous embodiment the timer will always go through at least one complete cycle and will only stop when the cams driven thereby are in the position shown in Figure 4. It will be noted that the depression in cam 433 is ahead of the depression in the other cams in a counter-clockwise direction so that before the timer completes its cycle switch blade 424 will be momentarily moved away from the contact 436. When the timer reaches such a point in its cycle that blade 424 is moved away from contact 436, if thermostatic blade 406 has moved away from contact 407 both the original energizing circuit and the maintaining circuit of relay 435 will be deenergized and this relay will move to its position as shown on the drawings. By reason however of the circuit for the timer extending through the left end of mercury switch 430 the timer will not be deenergized until the cams are in the position shown on the drawing. If however as in the previous embodiment, the thermostatic blade 406 is still in engagement with contact 407 when the blade 424 is momentarily separated from the contact 436 relay 435 will remain energized and the maintaining circuit will again be completed through the contact 436. Under these circumstances the timer will go through another complete cycle and the cam 403 will be moved another increment in a clockwise direction. In this manner the cam 403 may be moved one or more increments in a clockwise direction. When the temperature has risen to a value within the desired range and blade 406 has assumed a position intermediate the contacts 407 and 408 and the timer next causes blade 424 to separate from contact 436 the relay 435 will be deenergized. Deenergization of the relay will interrupt the above described circuits extending through its associated switches, the winding 401 will be deenergized and the valve 412 will move towards a closed position with the arm 402 dropping on to the surface of cam 403. The timer will continue in operation until the cams are in the position shown on Figure 4.

If the temperature should deviate in the opposite direction from that described above, that is, in a direction to cause blade 405 to engage contact 408, a circuit will be completed for energizing the relay 410 as follows: from secondary 49 through wire 437, wire 438, element 428, blade 406, contact 408, wire 469, winding 411, wire 470, wire 457, and wire 441 back to secondary 49. Blades 415 and 416 will be moved into engagement with their associated contacts, blade 416 engaging with contact 418 and completing a maintaining circuit for relay coil 411 as follows: from secondary 49 through wire 437, wire 438, wire 442, wire 443, wire 444, contact 436, blade 424, wire 445, wire 471, contact 418, blade 416, wire 472, wire 473, winding 411, wire 470, wire 457, and wire 441 back to secondary 49. Energization of relay 410 causes blade 415 to disengage from contact 419 interrupting the above described circuit of valve 414 causing this valve to close, blade 415 now engaging with contact 417 completing a circuit energizing the timer which circuit is as follows: from secondary 49 through wire 437, wire 438, wire 442, wire 474, blade 415, contact 417, wire 413, wire 452, wire 453, timer 425, wire 454, wire 464, wire 455, wire 456, wire 457, and wire 441 back to secondary 49. Engagement of blade 416 with contact 418 also completes a circuit for energizing the appropriate winding of motor 416 to move the cam 403 in a counter-clockwise direction, this circuit being as follows: from secondary 49 through wire 437, wire 438, wire 442, wire 443, wire 444, contact 436, blade 424, wire 445, wire 471, contact 418, blade 416, wire 472, wire 475, blade 429, contact 431, wire 476, the appropriate winding of motor 416, wire 463, wire 464, wire 455, wire 456, wire 457, and wire 441 back to secondary 49. Thus the cam 403 will be rotated an increment in a counter-clockwise direction while the timer is rotating its associated cams through several degrees, that is, until blade 429 is disengaged from contact 431, and the mercury switch 430 is tilted so that its left end is made, these latter actions taking place at the same time. When the left end of mercury switch 430 is made a circuit is completed energizing the timer which circuit is independent of the relays as described above so that the timer will go through at least one complete cycle. It will be understood that under the conditions above described the timer will go through one or more cycles depending upon how long the relay 410 remains energized, the relay 410 being deenergized when the blade 406 has moved away from contact 408 and cam 433 next causes blade 424 to disengage from contact 436. It will be understood that while the timer is going through these one or more cycles the cam 403 is being rotated by successive increments in a counter-clockwise direction so as to permit the stem of valve 412 to move downwardly with the arm 402 remaining in contact with the surface of the cam, it being remembered that the winding 401 is now deenergized. When the relay 410 is deenergized the valve 414 will be opened through the circuit above described and the standby valve will again be placed in control, the standby valve now being in a position nearer closed by an amount dependent upon the length of time that the relay 410 was energized.

Thus it will be seen by those skilled in the art that the present embodiment operates similarly to that of Figure 3, utilizing the valve arrangement particularly of Figure 2. In the present embodiment as will be apparent the maintaining circuits for the relays are not controlled by the thermostat so as to cause the relays to remain in until there has been a definite rise in temperature. On the other hand the maintaining circuits of the relays are controlled by the timer in such a manner as to insure that the relays will remain in for substantially one cycle of the timer or in other words, to insure that the cam 403 will be moved at least one increment in the appropriate direction. Furthermore it will be noted that when in the present embodiment the temperature deviates beyond a predetermined range in either direction a substantial change is immediately made in the rate at which heat is supplied and this changed rate is maintained in effect throughout substantially at least one cycle of the timer to positively give the temperature an opportunity to return to a value within the desired range, that is, if the thermostat should only momentarily engage one of its associated contacts due to a sudden but not lasting change in temperature neither of the relays would be momentarily energized and deenergized. There can be no chattering of the relays by reason of the time controlled maintaining circuits, and moreover a more important effect of the time controlled maintaining circuits as stated above is that when the temperature has deviated to one of the limits of the range, the system acts positively to return it to a value within the range.

Those skilled in the art will appreciate and understand the novelty and advantages of the present invention as they have been pointed out in connection with the description of the individual embodiments, it being apparent that there are principles upon which the operation of the various embodiments is based which are common to all of them.

The disclosed embodiments of my invention are intended to be illustrative and representative and that the scope of the invention is to be limited not by my disclosure but only by the appended claims.

I claim as my invention:

1. In a temperature control system employing temperature changing equipment wherein the temperature changing effect depends on the rate of flow of a fluid medium, the method of control comprising supplying fluid medium at a fixed rate during a period of time while the temperature is changing a predetermined amount and thereafter supplying fluid medium at a rate proportional to the duration of said period of time.

2. In a temperature control system employing temperature changing equipment wherein the temperature changing effect depends on the rate of flow of a fluid medium, the method of control comprising supplying fluid medium at a fixed rate when the temperature has deviated a given amount from a predetermined value, continuing the supply at said fixed rate during a period of time until the temperature is restored to said predetermined value and thereafter supplying fluid medium at a rate proportional to the length of said period of time.

3. In a temperature control system of the type employing variable capacity temperature changing equipment and an on and off thermostat, the method of control comprising operating the temperature changing equipment at a given rate while the thermostat is calling for heat and at a rate proportional to the duration of the preceding call for heat when the thermostat is satisfied.

4. In a temperature control system having temperature changing means the method of control comprising operating the temperature changing equipment at a rate proportional to the length of time required for the temperature to change a given amount, and whenever the temperature deviates from a given range, substantially changing the rate in a direction to bring the temperature back into said range.

5. In a temperature control system having temperature changing means, the method of maintaining the temperature within a given range comprising substantially modifying the temperature changing rate when the temperature deviates from said range so as to bring it back into said range relatively quickly, and after a given change in temperature in a direction to bring it back into said range operating said temperature changing means at a rate adjusted in accordance with the length of time required to produce said change.

6. In a temperature control system employing temperature changing equipment wherein the temperature changing effect depends on the rate of flow of a fluid medium, in combination, valve means controlling the flow of fluid medium, thermostatic means for causing a predetermined flow of fluid through said valve means in response to a demand for temperature change, and means controlled by said thermostatic means for positioning said valve means to produce a flow of medium after said demand is terminated which is proportional to the duration of said demand.

7. In a temperature control system employing a fluid medium, in combination, a main control valve and a standby valve, thermostatic means for opening said main valve in response to a demand for temperature change and means controlled by said thermostatic means for positioning said standby valve to produce a flow of medium proportional to the duration of said demand and for placing said standby valve in control of the flow of medium at the termination of said demand.

8. In a temperature control system, in combination, temperature changing means, means for varying the temperature changing effect of said first means, control means comprising a thermostat for operating said first means at a relatively high rate when said thermostat is influenced by a predetermined temperature condition, said control means including means whereby said first means is operated at a different rate when the temperature condition affecting said thermostat has changed a given amount, and means responsive to the thermostat whereby said different rate is proportional to the time required for said given amount of change to be affected.

9. In a stage temperature control system, in combination, temperature changing means having first and second stage operating capacities, thermostatic control means, said last means being operable to bring about first stage operation of the temperature changing means in response to a predetermined temperature, and means responsive to said control means for varying the second stage capacity in accordance with the length of time the temperature changing means is operated at first stage capacity.

10. In a temperature control system for maintaining temperature within a given range, in combination, heat supply means, temperature control means for supplying heat at a high rate when the temperature deviates below a given range and for cutting off the heat supply when the temperature deviates above said range, means for supplying heat when the temperature is within said range, and means whereby said last mentioned means is adjusted for supplying heat at a different rate when the temperature deviates from said range, said adjusting means including means whereby the amount of adjustment is proportional to the length of time the temperature is outside said range.

11. In a temperature control system employing a fluid medium, in combination, main control valve means and a standby valve, thermostatic means having a satisfied position, a position calling for temperature change in one direction and a position calling for temperature change in the opposite direction, means whereby the standby valve is in control when the thermostat is in satisfied position, means whereby the thermostat controls the main control valve means to substantially change the rate of flow of medium when the thermostat is calling for temperature change and means controlled by the thermostat for positioning the standby valve in accordance with the length of time the thermostat is calling for temperature change.

12. In a temperature control system employing a fluid medium, in combination, main control valve means and a standby valve, thermostatic means having a satisfied position, a position calling for temperature change in one direction and a position calling for temperature change in the opposite direction, means whereby the standby valve is in control when the thermostat is in satisfied position, means whereby the thermostat controls the main control valve means to substantially change the rate of flow of medium when the thermostat is calling for temperature change and means controlled by the thermostat for positioning the standby valve in accordance with the length of time the thermostat is calling for temperature change, the said last means being constructed and arranged to adjust the standby valve either in opening or closing direction depending on the direction of temperature change called for by the thermostat.

13. In apparatus of the character described, in combination, condition changing means, means responsive to a condition changed by said first means, means whereby said first means is operated at a given condition changing rate while the condition affecting said second means is changed a predetermined amount, and means whereby said first means is operated at a rate proportional to the time required for said predetermined amount of change in the condition after said change is brought about.

14. In apparatus of the character described, in combination, condition changing means, means responsive to a condition changed by said first means, means whereby said first means is operated at a given condition changing rate while the condition affecting said second means is changed a predetermined amount, means whereby said first means is operated at an adjusted rate after said predetermined amount of change is brought about, said last means being so constructed and arranged that the amount of adjustment in rate is proportional to the time required for said predetermined amount of change in the condition.

EDWARD C. WALSH.